(12) United States Patent
Hasegawa et al.

(10) Patent No.: US 8,946,598 B2
(45) Date of Patent: Feb. 3, 2015

(54) RETICULATE HEATER FOR STEERING WHEEL

(75) Inventors: Shirou Hasegawa, Tokyo (JP); Masahiro Nagai, Tokyo (JP)

(73) Assignee: SWCC Showa Device Technology Co., Ltd., Tokyo (JP)

( * ) Notice: Subject to any disclaimer, the term of this patent is extended or adjusted under 35 U.S.C. 154(b) by 1014 days.

(21) Appl. No.: 12/446,508

(22) PCT Filed: Oct. 10, 2007

(86) PCT No.: PCT/JP2007/001099
§ 371 (c)(1),
(2), (4) Date: Apr. 21, 2009

(87) PCT Pub. No.: WO2008/053580
PCT Pub. Date: May 8, 2008

(65) Prior Publication Data
US 2010/0237063 A1    Sep. 23, 2010

(30) Foreign Application Priority Data
Nov. 2, 2006 (JP) .................................. 2006-298713

(51) Int. Cl.
| | |
|---|---|
| *B60L 1/02* | (2006.01) |
| *H05B 3/10* | (2006.01) |
| *B62D 1/06* | (2006.01) |
| *H05B 3/34* | (2006.01) |

(52) U.S. Cl.
CPC *B62D 1/065* (2013.01); *H05B 3/34* (2013.01); *H05B 2203/005* (2013.01); *H05B 2203/007* (2013.01); *H05B 2203/011* (2013.01); *H05B 2203/014* (2013.01); *H05B 2203/017* (2013.01)
USPC .......................................... 219/204; 219/548

(58) Field of Classification Search
USPC .................................. 219/549, 204, 528, 548
See application file for complete search history.

(56) References Cited

U.S. PATENT DOCUMENTS

| | | | |
|---|---|---|---|
| 6,294,770 B1 * | 9/2001 | Hasegawa et al. | 219/544 |
| 2002/0033389 A1 * | 3/2002 | Sugiyama et al. | 219/204 |
| 2004/0149732 A1 * | 8/2004 | Usui et al. | 219/528 |

(Continued)

FOREIGN PATENT DOCUMENTS

| | | |
|---|---|---|
| DE | 41 22 363 | 9/1992 |
| JP | 11-097160 | 4/1999 |
| JP | 2001-110555 | 4/2001 |

(Continued)

*Primary Examiner* — Henry Yuen
*Assistant Examiner* — Hemant Mathew
(74) *Attorney, Agent, or Firm* — Bacon & Thomas, PLLC

(57) ABSTRACT

A reticulate heater for a steering wheel exhibits flexibility, elasticity and waterproofness. The reticulate heater comprises a reticulate heat generating element (11) consisting of a plurality of insulated heater wires (14) braided in a mesh form, and exhibiting flexibility and elasticity to permit tight contact with a curved surface, a waterproof stretch-film (12) covering the front and rear surfaces of the reticulate heat generating element (11) water-tightly and adhering to the reticulate heat generating element (11) while still keeping the flexibility and elasticity thereof, and an elastic adhesive (13) having flexibility and elasticity even after curing, applied to the whole surface of the stretch-film (12) on the adhering surface side in a planar and thin state, and bonding the stretch-film (12) to the reticulate heat generating element (11) water-tightly even if the stretch-film (12) is stretched within an allowable tensile range.

7 Claims, 7 Drawing Sheets

(56) References Cited

U.S. PATENT DOCUMENTS

| | | | |
|---|---|---|---|
| 2005/0067397 A1* | 3/2005 | Hilmer | 219/204 |
| 2005/0122206 A1* | 6/2005 | Reichel | 338/210 |

FOREIGN PATENT DOCUMENTS

| | | | | | |
|---|---|---|---|---|---|
| JP | 3079039 | | 5/2001 | | |
| JP | 2002-063984 | | 2/2002 | | |
| JP | 2002063984 A | * | 2/2002 | ............... | H05B 3/20 |
| JP | 2002-117961 | | 4/2002 | | |
| JP | 2003-123947 | | 4/2003 | | |
| JP | 2003-178859 | | 6/2003 | | |
| JP | 2003178859 A | * | 6/2003 | ............... | H05B 3/20 |
| JP | 2003-217802 | | 7/2003 | | |
| JP | 2003217802 A | * | 7/2003 | ............... | H05B 3/34 |
| JP | 2003-317905 | | 11/2003 | | |

* cited by examiner

Fig.1
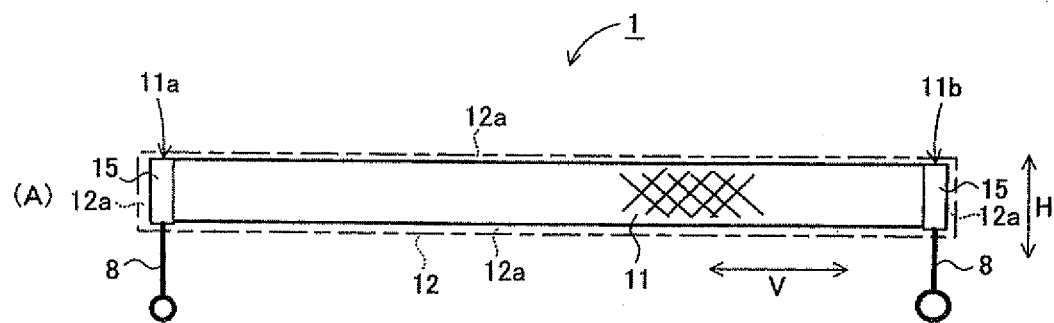
(A)
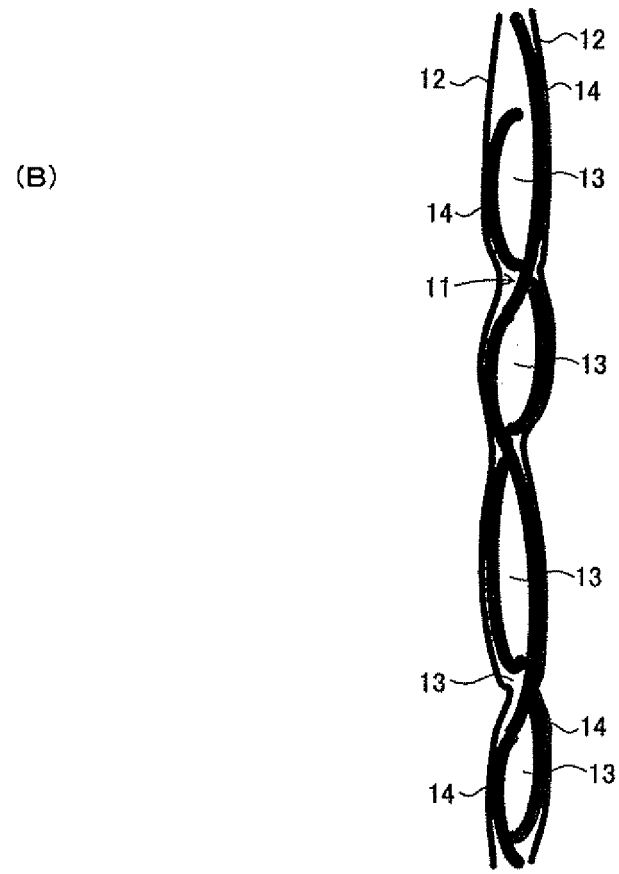
(B)

Fig. 4
(A) 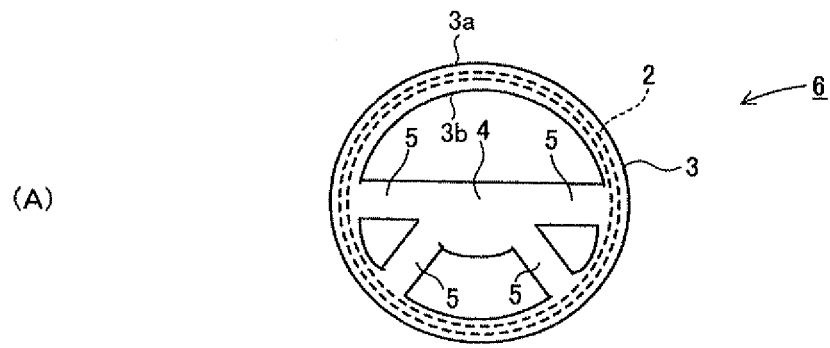
(B) 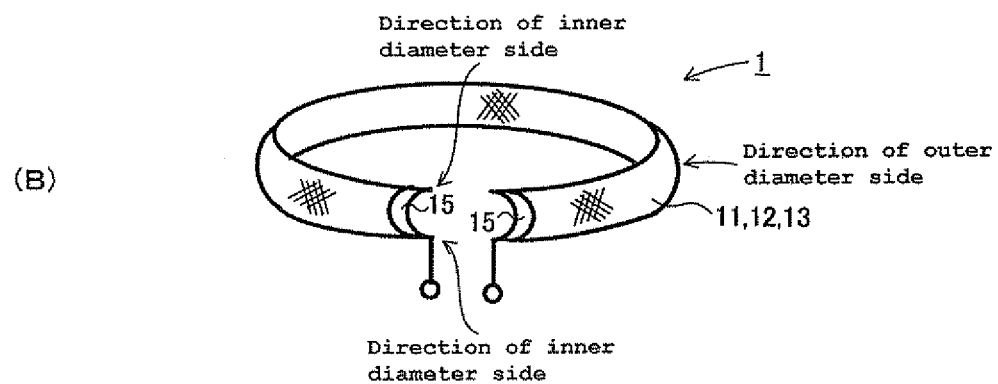
(C) 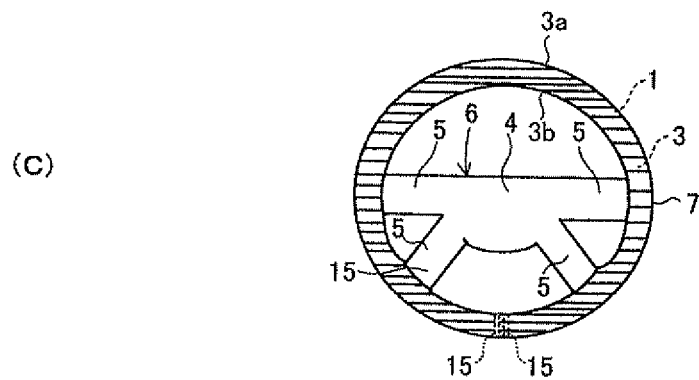

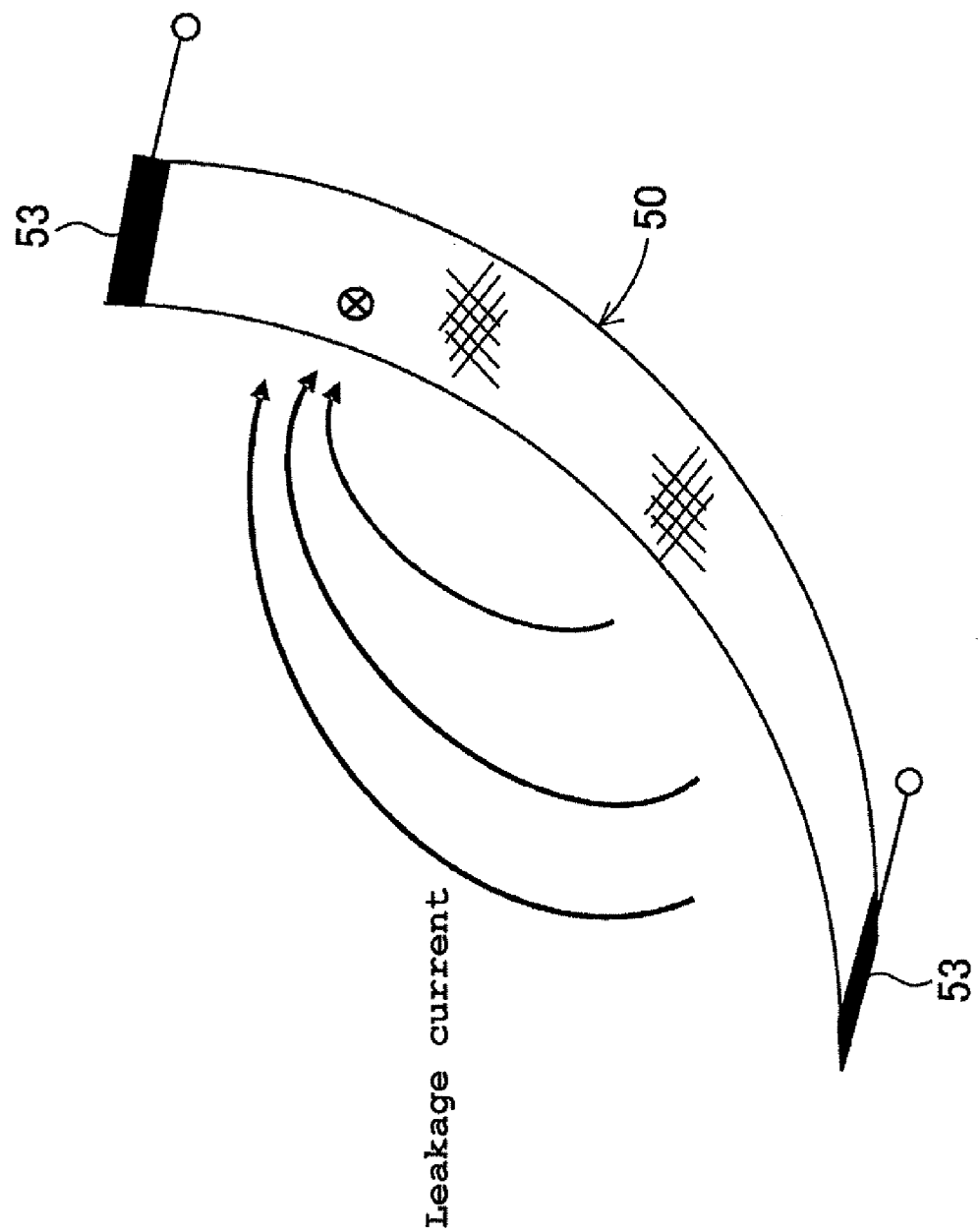

RETICULATE HEATER FOR STEERING WHEEL

TECHNICAL FIELD

This invention relates to a reticulate heater for steering wheel which covers and warms a whole circumference of the steering wheel. In particular, this invention relates to the reticulate heater for steering wheel which has flexibility and elasticity.

BACKGROUND ART

A heater for steering wheel of an automobile (a heater which is used for steering wheel for changing the direction of movement of the automobile) is spreading as the comfortable equipment of cold districts. In many steering wheels having this heater, the type that the surface skin is covered by leather is mainstream. Concretely, as shown in FIG. 5, the steering wheel consists of a ring portion 61 which is formed in the shape of a ring, a boss portion 62 which is arranged in the almost center position of the ring portion 61, a spoke portion 63 which combines the ring portion 61 and the boss portion 62 by lengthening from the inner diameter side of the ring portion 61 toward the boss portion 62, a planar heat generating element 50 which covers the circumference of the ring portion 61, and a surface skin portion 64 which covers by leather the circumference of the ring portion 61 which is covered by the planar heat generating element 50. And the whole circumference of the steering wheel can be warmed. In addition, the reason why the planar heat generating element 50 for covering the circumference of the ring portion 61 of a steering wheel 60 is used is for not losing the shape when adhering tightly to the ring portion 61 together with the elasticity and flexibility.

As such planar heat generating element 50, for example, the reticulate heater shown in FIG. 6 is disclosed (for example, refer to patent document No. 1). This reticulate beater 50 consists of a reticulate heat generating element 52 that the plurality of heater wire 51 are braided in a mesh form, and an electrode 53 for power feeding is provided at both end portions 52a, 52b of one direction of this reticulate heat generating element 52 in the separated state. The reticulate heat generating element 52 is formed by tricot knitting technique which knits loops by a plurality of heater wire 51 with continuous and planar state in the longitudinal direction. In the heater wire 51, the varnish for enamel wire is coated to the heater bare wire and baked, thereby the insulating sheath is formed, and the electrode 53 is protected by such as insulating tape.

The steering wheel 60 having this reticulate heater 50 has no problem to the insulating property or the waterproofness at the normal use condition. However, when such as sweat or drinking water soaks into the surface skin portion 64 repeatedly and in large quantity, the leakage current occurs by such as sweat or drinking water, and minute defects such as pinholes which occur at the insulating sheath of the heater wire 51 are generated, or the breaking of wire from corrosion of electrolysis by defect of insulating portion of soldered portion of the electrode 53 is generated. That is, as shown in FIG. 7, when applying electric current to the reticulate heater 50 in the water solution, the leakage current concentrates to the exposed portion of a conductor such as minute defects of pinholes and so on by potential difference of the reticulate heater 50 in the water solution, and thereby the electrolysis is caused. For example, these unfavorable cases might occur when the driver whose hands have much amount of sweating grips almost same portion of the steering wheel 60 for the long time, or when the driver slops the drinking water and so on accidentally to the steering wheel 60, or when driving during the long time in the rainy condition on the open car which opens the roof.

For these unfavorable points of the reticulate heater 50, the application of the planar heat generating element which covers the metallic thin film which generates heat by applying electric current by the polyester film with adhesive comprising polypropylene or polyethylene is considered (for example, refer to patent document No. 2). In this planar heat generating element, the hot press machine or the laminating machine is used when bonding the polyester film to the metallic thin film.

Patent document No. 1: Japanese Patent Publication No. 2001-110555
Patent document No. 2: Japanese Patent Publication No. 2002-117961

DISCLOSURE OF THE INVENTION

Problem to be Solved by the Invention

However, because the polyester film which can withstand the high temperature and the pressure of the hot press machine or the laminating machine has hardly elasticity, there is a difficult point that the elasticity of the reticulate heat generating element 52 as the feature of the reticulate heater 50 cannot be utilized effectively. And because the hot press machine or the laminating machine crushes the reticulate heat generating element 52, the heater wire 51 of the reticulate heat generating element 52 might be damaged. Furthermore, because the polyester film melts and adheres to the reticulate heat generating element 52 by the hot press machine or the laminating machine, there is a difficult point that the gap occurs between the reticulate heat generating element 52 and the polyester film.

This invention was conducted to solve these conventional difficult points. And this invention aims to provide the reticulate heater for steering wheel which also has the waterproofness with the flexibility and the elasticity.

Means for Solving the Problems

The reticulate heater for steering wheel which is the first feature of this invention to accomplish above-mentioned purpose is provided with a reticulate heat generating element whose plurality of insulated heater wire are braided in a mesh form, and having flexibility and elasticity which can bond tightly for a curved surface, a waterproof stretch-film which covers the both faces of the reticulate heat generating element water-tightly and bonds to the aforementioned reticulate heat generating element in the state of holding the flexibility and the elasticity of the aforementioned reticulate heat generating element, an elastic adhesive which has the flexibility and the elasticity even after curing, and is applied on the whole surface of the bonding plane side of the stretch-film in the planar and thin state, and which bonds aforementioned stretch-film and the reticulate heat generating element water-tightly even if the stretch-film is stretched within the allowable range of the tensile strength.

According to the reticulate heater for steering wheel as such first feature, because it is possible to bond the stretch-film and the reticulate heat generating element by the elastic adhesive water-tightly, when fixing the reticulate heater to the steering wheel, the portion of the reticulate heater which is positioned at the direction of the outer diameter side of the steering wheel can be bonded tightly to the outer diameter side direction of the steering wheel in the stretched state by stretching the reticulate heater. And in the portion of the reticulate heater which is positioned at the direction of the inner diameter side of the steering wheel, because the stretch-film shrinks toward the original size, the whole of the reticulate heater can be bonded tightly and fixed without wrinkles to the steering wheel.

As for the second feature of this invention, in the reticulate heater for steering wheel which is the first feature, the stretch-film is a polyolefin series stretch-film. According to such the reticulate heater for steering wheel, it is possible to stretch about 15% of the whole length in the tensile direction by the small tensile force.

As for the third feature of this invention, in the reticulate heater for steering wheel which is the first feature, the stretch-film is a polyvinyl chloride series stretch-film. According to such the reticulate heater for steering wheel, it is possible to stretch about 20% of the whole length in the tensile direction by the small tensile force.

As for the fourth feature of this invention, in the reticulate heater for steering wheel which is the second feature, a base material of the elastic adhesive is a water-based adhesive of the acrylic copolymer when the stretch-film is the polyolefin series stretch-film. According to such the water-based adhesive, the adhesive can be applied in the planar and thin state to the whole surface of the adhesive side of the polyolefin series stretch-film whose adhesion is difficult.

As for the fifth feature of this invention, in the reticulate heater for steering wheel which is the third feature, the elastic adhesive is any one of synthetic rubber series, silicone-modified epoxy resin series or silicone rubber series when the stretch-film is the polyvinyl chloride series stretch-film. According to the elastic adhesive of such a series, the adhesive can be applied in the planar and thin state to the whole surface of the adhesive side of the polyvinyl chloride series stretch-film.

As for the sixth feature of this invention, in the reticulate heater for steering wheel which is any one from the first feature to the fifth feature, a thickness of the stretch-film is from 5 µm or more to 50 µm or less. According to such the reticulate heater for steering wheel, when the thickness of the stretch-film becomes thin than 5 µm, because it becomes easy to break, the deterioration of the strength or the water shielding characteristic is caused. And when the thickness of the stretch-film becomes thick than 50 µm, the deterioration of the elasticity is caused.

As for the seventh feature of this invention, in the reticulate heater for steering wheel which is any one from the first feature to the fifth feature, a thickness of the stretch-film is from 10 µm or more to 20 µm or less. According to such the reticulate heater for steering wheel, all functions of the water shielding characteristic, the flexibility, the elasticity and the strength can satisfy fully.

As for the eighth feature of this invention, in the reticulate heater for steering wheel which is any one from the first feature to the seventh feature, the stretch-film is formed in a size which covers the reticulate heat generating element including an overlap width by the elastic adhesive. According to such the reticulate heater for steering wheel, the whole of the reticulate heat generating element can be enclosed by the stretch-film and can be sealed water-tightly.

As for the ninth feature of this invention, in the reticulate heater for steering wheel which is any one from the first feature to the eighth feature, the reticulate heat generating element is formed by tricot knitting technique that a plurality of the insulated heater wire knit loops in continuous and planar state in a longitudinal direction. According to such the reticulate heater for steering wheel, because the reticulate heat generating element itself is formed by tricot knitting technique, it is rich in the elasticity and has the flexibility. Therefore, it is possible to make the reticulate heat generating element itself adhere tightly to the steering wheel.

As for the tenth feature of this invention, in the reticulate heater for steering wheel which is the ninth feature, the reticulate heat generating element includes an electrodes which are provided in both end portions of the longitudinal braiding direction which is the braiding direction of the loops in the distant state so that the electric current can be applied. According to such the reticulate heater for steering wheel, the electrode can be also covered water-tightly by the stretch-film.

As for the eleventh feature of this invention, in the reticulate heater for steering wheel which is the tenth feature, the electrode is soldered by stacking end portions of predefined numbers of heater wire onto a rectangle metal foil in planar and thin state. According to such the reticulate heater for steering wheel, as for the electrode, because the metal foil and the reticulate heat generating element are soldered in the planar and thin state, the electrode itself can be formed thinly and the damage of the flexibility of the electrode can be prevented.

Effect of the Invention

According to the reticulate heater for steering wheel of this invention, the waterproofness together with the flexibility and the elasticity also could be obtained.

BRIEF DESCRIPTION OF THE FIGURES

[FIG. 1] A view showing a preferable embodiment in the reticulate heater for steering wheel of this invention, (A) is a whole plain view, and (B) is a partial sectional view.

[FIG. 4] A view showing an applied state of reticulate heater for steering wheel of this invention, (A) is a plain view of the steering wheel, (B) is a perspective view which shows the shape of the heater itself when fixing the reticulate heater to the steering wheel, and (C) is a plain view of the state that the circumference of the steering wheel to which the reticulate heater is fixed is covered by the leather.

[FIG. 7] A explanation view showing the state where the electric current is applied to the conventional heater for steering wheel in the water solution.

BEST MODE FOR CARRYING OUT THE INVENTION

Figure 2:
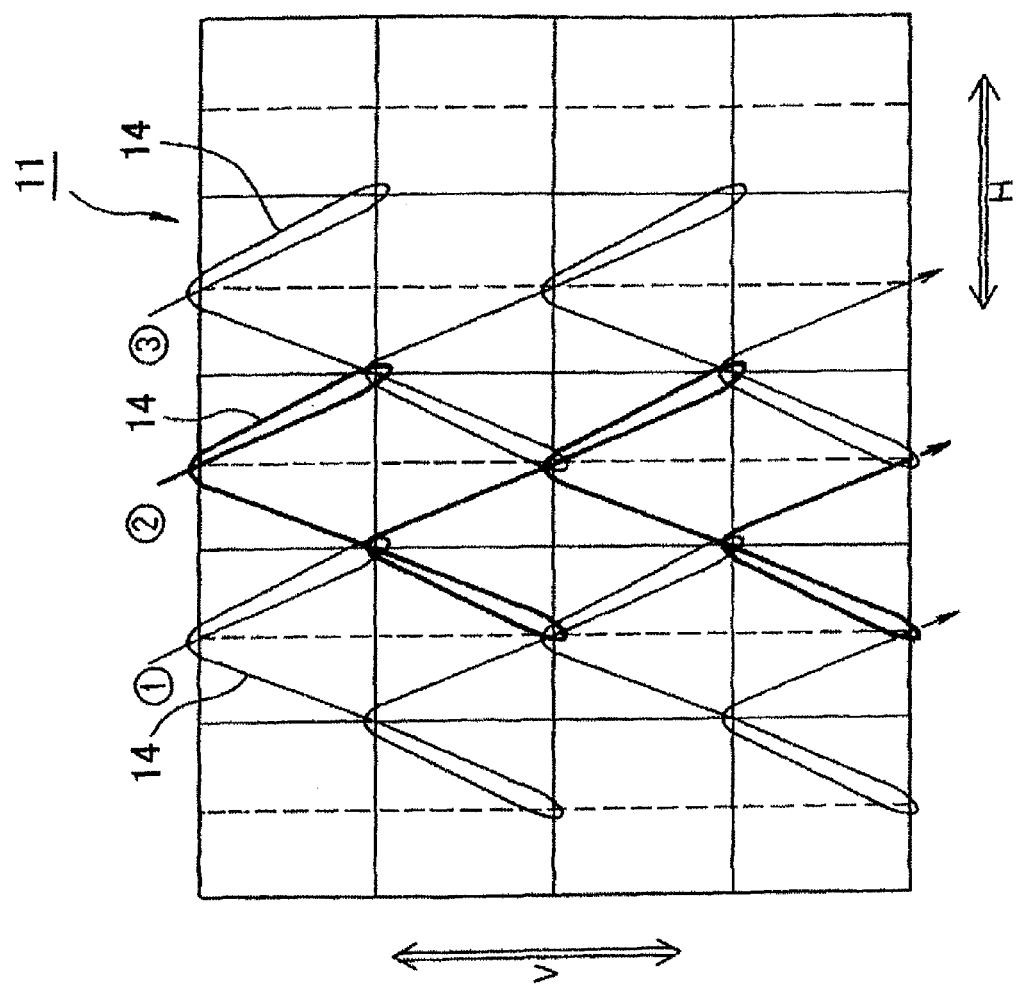
[FIG. 2] A pattern view of the case that the reticulate heat generating element which is the component of the reticulate heater for steering wheel of this invention is knitted by tricot.

Hereinafter, the preferred embodiments which applied the reticulate heater for steering wheel of this invention are explained with reference to the drawings.

For example, as shown in FIG. 4(A), the steering wheel using the reticulate heater for steering wheel of this invention consists of a rim 2 which is formed in the shape of a ring, a ring portion 3 that the rim 2 is covered by synthetic resin, a boss portion 4 which is arranged in the almost center position of the ring portion 3, an outer diameter surface portion 3a of the ring portion 3 of the steering wheel, an inner diameter surface portion 3b of the ring portion 3 of the steering wheel, and a spoke portion 5 which combines the ring portion 3 and the boss portion 4 by lengthening from the inner diameter side of the ring portion 3 toward the boss portion 4. This steering wheel 6 is for automobiles, and a front wheel can be steered by embedding the boss portion 4 to a steering shaft (not shown in drawing). The reticulate heater for steering wheel of this invention is arranged so that the whole circumference of the ring portion 3 is covered.

As shown in FIG. 1(A), (B), the reticulate heater for steering wheel of this invention is provided with a reticulate heat generating element 11 whose plurality of insulated heater wire 14 are braided in a mesh form, and having the flexibility and the elasticity which can bond tightly for the curved surface, a waterproof stretch-film 12 which covers the both faces of the reticulate heat generating element 11 water-tightly and which bonds to the aforementioned reticulate heat generating element 11 in the state of holding the flexibility and elasticity of the aforementioned reticulate heat generating element 11, an elastic adhesive 13 which has the flexibility and the elasticity even after curing, and is applied on the whole surface of the bonding plane side of the stretch-film 12 in the planar and thin state, and which bonds aforementioned stretch-film 12 and reticulate heat generating element 11 water-tightly even if the stretch-film 12 is stretched within the allowable range of the tensile strength, and an overlap width 12a which has sufficient space for adhesion by the elastic adhesive 13. In addition, in FIG. 1(A), the stretch-film 12 is shown by the dashed line.

As shown in FIG. 2, the reticulate heat generating element 11 is formed by using the plurality of heater wire 14 which have uniform diameter and, for example, by tricot knitting technique. In the heater wire 14 of this reticulate heat generating element 11, the use of the commercially available enamel wire whose diameter is almost uniform and which consists of copper and is coated by the varnish for enamel wire onto the heater bare wire is preferable for cost-reduction. The copper alloy in which nickel contains more than 1% or the alloy which is resistant to corrosion such as nichrome wire is also preferable as the heater bare wire. The adoption of the material of this heater wire 14 is set according to the calorific value per unit area of the reticulate heat generating element 11.

The varnish for enamel wire is coated onto the heater bare wire and baked, thereby an insulating film is formed. As for this varnish for enamel wire, the one having polyvinyl acetal, polyurethane, polyimide-imide, or polyimide as the main component is preferable. The varnish for enamel wire having polyvinyl acetal or polyurethane as the main component has a heat resistance of 100-150° C., and furthermore, soldering can be performed without peeling the film. Therefore, this varnish for enamel wire has higher reliability and enables the construction of the electrodes in a short time. In addition, because the varnish for enamel wire having polyamide-imide or polyimide as the main component has high heat resistance and good abrasion resistance, the tricot knitting can be performed easily. According to such varnish for enamel wire, (1) the insulating characteristic can be ensured by extremely thin and uniform film. For example, in the case of the metal conductor having diameter of 0.07 mm, if using a JIS 3rd enamel wire, because the minimum film thickness becomes 0.003 mm, the outer diameter of the heater wire does not become thick beyond necessity. (2) the heater wire can resist against the severe mechanical bending when knitting. (3) as necessary, it is possible to select the heat-resistant grade widely, and except for specific one, it becomes possible to select from 150-240° C. under UL standard.

If the diameter of the heater wire 14 that the varnish for enamel wire is coated onto such heater bare wire is 0.02-0.12 mm, preferably if it is 0.06-0.08 mm, it is possible to satisfy both of the strength and the flexibility. Therefore, because the heater wire having thinner diameter and higher flexibility can be provided, when knitting the plurality of the heater wire 14 so that the loops continue in the longitudinal direction, the reticulate heat generating element 11 which is rich in the elasticity and the flexibility can be provided.

Figure 3:
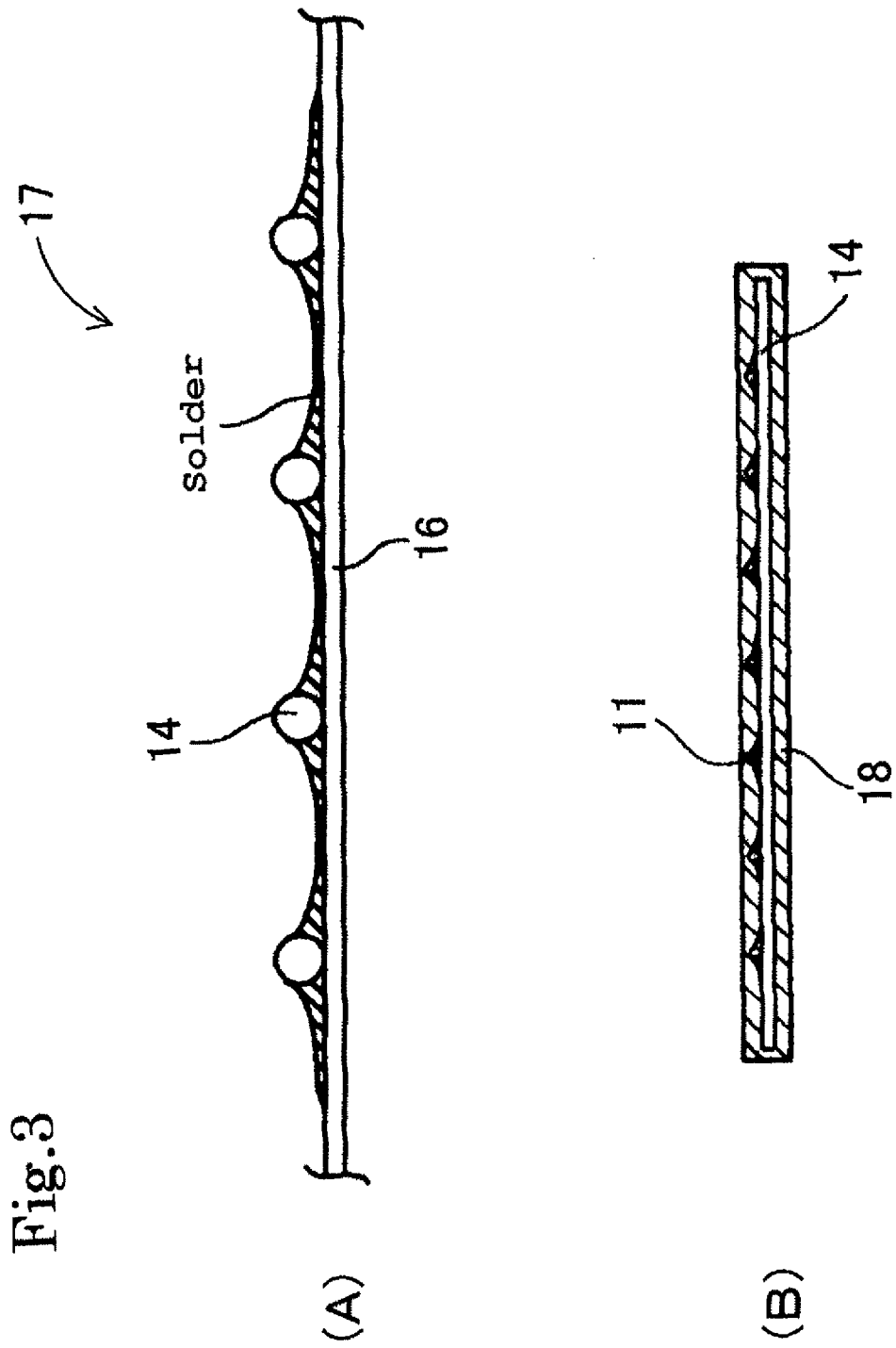
[FIG. 3] A view showing an electrode which is the component of the reticulate heater for steering wheel of this invention, (A) is an explanation view of soldering, and (B) is a sectional view of the electrode.
Figure 5:
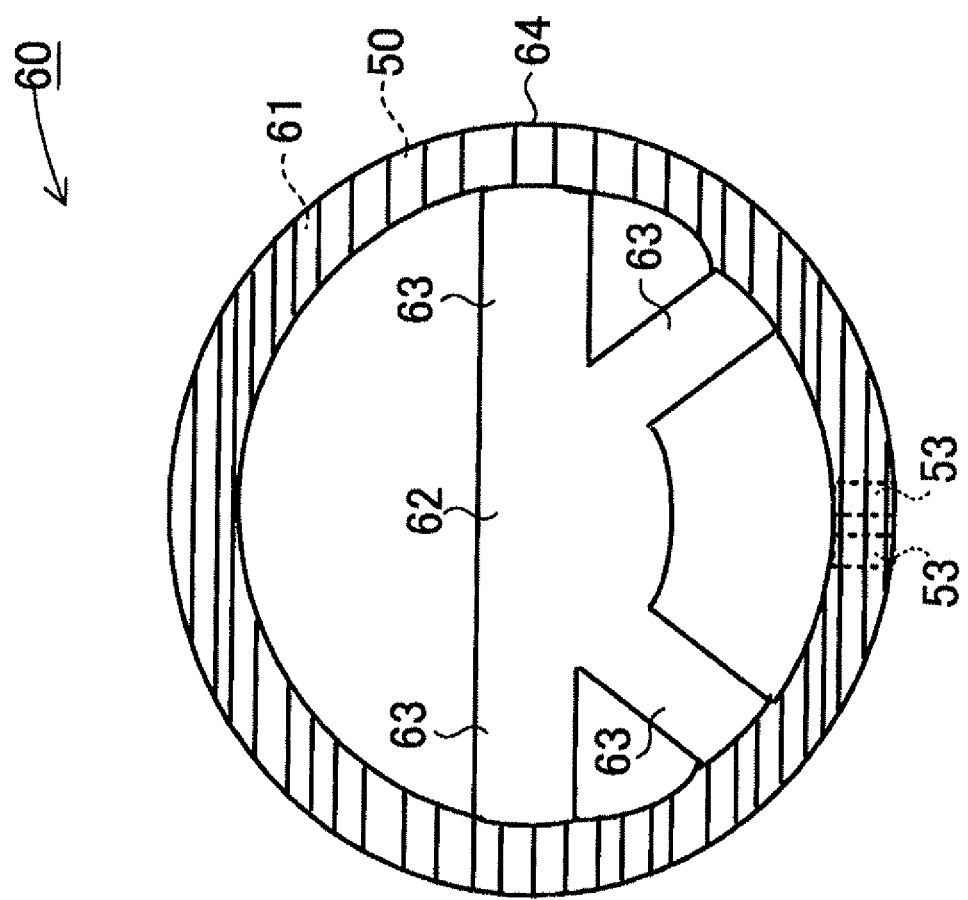
[FIG. 5] A explanation view of the state fixing the conventional heater for steering wheel to the steering wheel.
Figure 6:
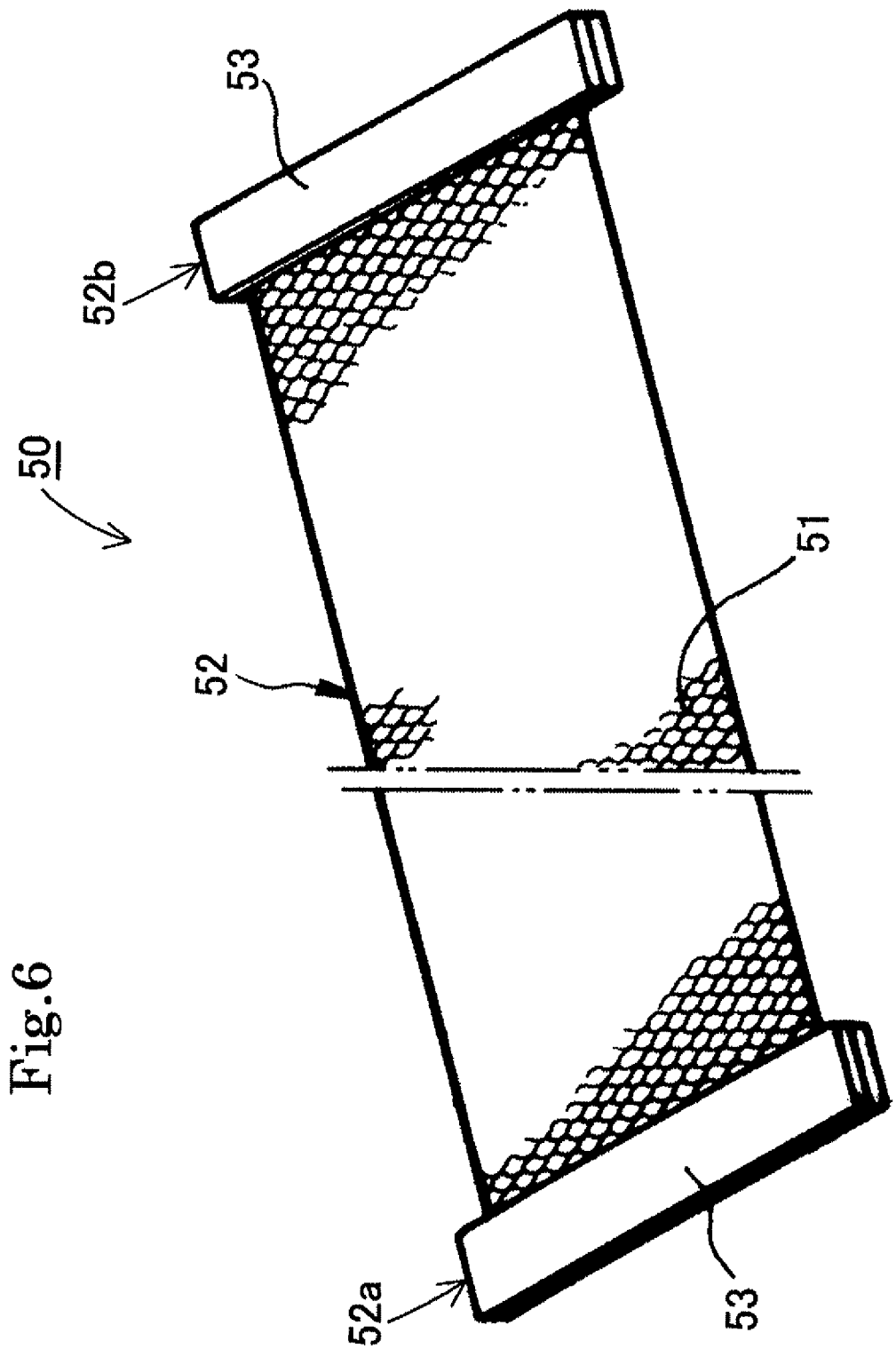
[FIG. 6] A whole perspective view showing the conventional heater for steering wheel.

Besides, as shown in FIG. 1(A), in both end portions 11a, 11b of the longitudinal direction V which is the braiding direction of the loops of the reticulate heat generating element 11 that the plurality of the heater wire 14 are braided in the mesh form, the electrodes 15 are respectively arranged in the distant state so that the electric current can be applied. As shown in FIG. 3(A), (B), this electrode 15 consists of an electrode base layer 17 that the end portions of the predefined number of heater wire 14 are stacked and are soldered onto a metal foil 16 in the planar and thin state, and a insulating material 18 which bonds in the state of covering both faces of the electrode base layer 17.

The metal foil 16 which forms the electrode base layer 17 is a rectangle having predefined width and length, and consists of the thickness of 0.01 mm-0.5 mm. And it is preferable to perform the coating treatment by plating the nonferrous metal such as tin, solder or gold having the electric conductivity and the corrosion resistance. In addition, even if the metal foil itself is the nonferrous metal such as gold, silver or nickel having the electric conductivity and the corrosion resistance, the similar effect can be obtained. The soldering is performed all over the width of the metal foil 16 for the planar heat generating element 11 which is stacked onto the metal foil 16 in the planar state which is thinner than the thickness of the aforementioned metal foil 16 by the heated soldering iron. As the thickness of this solder, 5 μm-30 μm is preferable. As such solder which can perform the soldering, it is preferable that the flux content is much, the high temperature characteristic is good and the solderability is superior. In addition, from the view of the environmental protection, in the solder, Pb-free solder such as tin-silver-copper series or tin-silver-bismuth series is preferable.

As the insulating material 18, the non-woven fabric that the flame-retardant treatment is given and is for example the polyester fiber having rich elasticity, flexibility and heat resistance is preferable. Besides, as the adhesive to bond the insulating material 18 to the electrode base layer 17, from the view of the flame retardancy and the heat resistance, such as the silicone series, flame-retardant acrylic series, or the thermoset rubber series is preferable. And, as the insulating material except the non-woven fabric, such as the flame-retardant Nomex adhesive tape, the flame-retardant cloth adhesive tape, the polyimide tape, or the fluorine resin tape is preferable. In addition, when, the stretch-film 12 has the physical strength, the insulating material 18 can be omitted.

As described above, because the electrode 15 is constituted by stacking the end portions of the predefined numbers of heater wire 14 onto the metal foil 16 and by soldering in the planar and thin state, the electrode itself can be formed thinly and the damage of the flexibility of the electrode can be prevented.

In addition, although not shown in the drawing, the knitted stitches which are formed at both end portions of other direction of the reticulate heat generating element not having the electrode are whipstitched by the synthetic fiber yarns having the heat resistance so that these knitted stitches do not unknit respectively. Thereby, because it is possible to prevent the excessive expansion and contraction toward the longitudinal direction V which is the direction of knitting the loop of the reticulate heat generating element 11, the deformation of the aforementioned reticulate heat generating element 11 can be prevented.

The waterproof stretch-film 12 has the flexibility and the elasticity together with the water shielding characteristic, and is formed in the size which covers the reticulate heat generating element 11 including the overlap width by the elastic adhesive 13, and two stretch-films are used in order to cover both faces of the reticulate heat generating element 11. Here, the overlap width means the sufficient space for adhesion which is formed at the outer circumference of the reticulate heat generating element 11. Thereby, the whole of the reticulate heat generating element 11 can be enclosed by the stretch-film 12 and can be sealed water-tightly by the elastic adhesive 13. In addition, when the waterproofness of the electrode 15 itself is weak, the stretch-film 12 is formed in the size including also this electrode 15.

As the stretch-film 12 having such the function, the polyolefin series stretch-film or the polyvinyl chloride series stretch-film is preferable. In the polyolefin series stretch-film, for example, when the tensile direction is the longer direction in the test piece having the width of 30 mm and the length of 100 mm, it is possible to stretch about 15% of the whole length in the longer direction by the small tensile force. Besides, in the polyvinyl chloride series stretch-film, for example, when the tensile direction is the longer direction in the test piece having the width of 30 mm and the length of 100 mm, it is possible to stretch about 20% of the whole length in the longer direction by the small tensile force. In addition, in the polyvinylidene chloride series film which is used as the kitchen wrap film, for example, when stretching the test piece having the width of 30 mm and the length of 100 mm, because the break occurs when stretching about 8% of the whole length, it is confirmed by the inventors of this invention that the elasticity is inferior.

Besides, the thickness of the stretch-film 12 is decided by the thickness which can satisfy all functions of the water shielding characteristic, the flexibility, the elasticity and the strength. The thickness is from 5 μm or more to 50 μm or less, and is preferably from 10 μm or more to 20 μm or less. When the thickness of the stretch-film 12 becomes thin than 5 μm, because it becomes easy to break, the deterioration of the strength or the water shielding characteristic is caused. And when the thickness of the stretch-film 12 becomes thick than 50 μm, the deterioration of the elasticity is caused. Therefore, by setting the thickness from 10 μm or more to 20 μm or less, all functions of the water shielding characteristic, the flexibility, the elasticity and the strength can satisfy fully.

The elastic adhesive 13 shows the strong rubber elasticity and the wide-ranging adhesiveness. And when the stretch-film 12 is the polyolefin series stretch-film, it is preferable that the base material is the water-based adhesive of the acrylic copolymer. This water-based adhesive is the water colloidal adhesive and becomes the strong chemically-bonded body after hardening, thereby the water resistance is excellent. Therefore, the adhesive can be applied in the planar and thin state to the whole surface of the adhesive side of the polyolefin series stretch-film whose adhesion is difficult, and waterproofness can be given to the adhesive itself. Besides, when the elastic adhesive 13 is the polyvinyl chloride series stretch-film, any one of synthetic rubber series, silicone-modified epoxy resin or silicone rubber series is good. Each of these can be applied in the planar and thin state to the whole surface of the adhesive side of the polyvinyl chloride series stretch-film.

In addition, the reason for applying the elastic adhesive 13 in the planar and thin state to the whole surface of the adhesive side of the stretch-film 12 is for reducing the thickness of the reticulate heater 1 itself. However, the thickness that the heater wire 14 of the reticulate heat generating element 11 can seal completely without clearance must be ensured.

Next, the method for producing the reticulate heater and the method for fixing the reticulate heater to the steering wheel are explained.

(1) Method for Producing the Reticulate Heater

The reticulate heat generating element 11 is provided with the above-mentioned two electrodes 15, 15, and the lead wire 8 for applying on electricity is fixed electrically to each electrodes 15, 15.

First, the elastic adhesive 13 is applied in the planar and thin state to the whole surface of the adhesive side of two stretch-films 12 respectively. In order to apply in the planar and thin state, the roller, the brush or the spray and so on can be used. And, one stretch-film 12 that the elastic adhesive 13 is applied is put onto the flat surface by placing the adhesive side up. The reticulate heat generating element 11 which is provided with the electrodes 15, 15 is put onto the predefined place of this stretch-film 12, and furthermore, another stretch-film 12 is covered onto this by placing the adhesive side below. Thereby, inserting the reticulate heat generating element 11 between two stretch-films 12 water-tightly becomes possible. At this time, the reticulate heat generating element 11 that the stretch-films 12 are bonded to both faces is pressed by the roller, and thereby, two stretch-films 12 and the reticulate heat generating element 11 can be bonded firmly. Therefore, the reticulate heat generating element 11 in addition to two electrodes 15, 15 can be sealed water-tightly by two stretch-films 12 and the elastic adhesive 13, and the thickness of the reticulate heat generating element 11 itself can be formed very thinly. Besides, because reticulate heat generating element 11 is not crushed by the hot press machine or the laminating machine while heating, the heater wire 14 of the reticulate heat generating element 11 does not damage. In addition, because the lead wire 8 which is fixed electrically to two electrodes 15, 15 is for applying electric current, it is made to jump out of two stretch-films 12 except for a part.

(2) Method for Fixing the Reticulate Heater to the Steering Wheel

When fixing the reticulate heater 3 which was produced as mentioned above to the steering wheel 6, firstly, in the state which stretches the reticulate heater 1 so that the whole circumference of the ring portion 3 of the steering wheel 6 could be covered, several places of the portion of the reticulate heater 1 which is positioned at the direction of the outer diameter side of the ring portion 3 of the steering wheel 6 are fixed by the double-faced tape or the adhesive. Because the reticulate heat generating element 11, two stretch-films 12 and the elastic adhesive 13 has the flexibility and the elasticity respectively, as shown in FIG. 4(B), the portion of the reticulate heater 1 which is positioned at the direction of the outer diameter side of the ring portion 3 of the steering wheel 6 can bond tightly to the direction of the outer diameter side of the ring portion 3 of the steering wheel 6 in the state that it is stretched. At this time, because the stretch-film 12 shrinks toward the original size by the restoring force, the portion of the reticulate heater 1 which is positioned at the direction of the inner diameter side of the ring portion 3 of the steering wheel 6 is fixed in that state at several places of the portion of the reticulate heater 1 which is positioned at the direction of the inner diameter side of the ring portion 3 of the steering wheel 6 by the double-faced tape or the adhesive. As described above, by fixing the reticulate heater 1 to the ring portion 3, the whole of the reticulate heater can be bonded tightly and fixed without wrinkles to the ring portion 3 of the steering wheel.

And, as shown in FIG. 4(C), the surface skin portion 7 is constructed by covering with leather the circumference of the ring portion 3 which is covered by the reticulate heater 1. And thereby, the leather-wrapped steering wheel which has high grade feeling can be achieved.

The reason why the reticulate heater 1 must be fixed in this way is because the difference between the length of the circumference (outer circumference) in the outer diameter of the ring portion 3 of the steering wheel 6 and the length of the circumference (inner circumference) in the inner diameter of the ring portion 3 of the steering wheel 6 occurs. For example, when the outer diameter of the steering wheel 6 is 390 mm and the cross sectional diameter of the ring portion 3 which becomes the grip portion is 30 mm, the difference of the length between the diameter of the outer circumference and the diameter of the inner circumference becomes about 15%. Therefore, if the film and the adhesive in addition to the reticulate heat generating element do not have the flexibility and the elasticity, the difference of that length cannot be absorbed, and thereby, the wrinkles in the film occur and the exfoliation or the breakage in the adhesive occurs. That is, in the reticulate heater which has the flexibility, but which is poor in the elasticity, because it has the flexibility, it is possible to bend it along the outer circumference of the steering wheel. However, because it does not have the elasticity, the wrinkles occur when bending it along the cross sectional circumference of the grip portion. On the other hand, in the reticulate heater of this invention having the flexibility and the elasticity, because it has the flexibility, it is possible to bend it along the outer circumference of the steering wheel, and that, because it has the elasticity, it is possible to bend it along the cross sectional circumference of the grip portion without the wrinkles.

In the reticulate heater 1 like this, the following experiments were performed.

About the content of the experiment, the electric current was applied to the reticulate heater 1 while immersing it in the salt water. And the state of applying electric current at the time was monitored.

As the test piece of this experiment, the heater wire which is coated by JIS 3rd urethane insulation on the heater bare wire which is the copper alloy of 0.075 mm diameter was formed by tricot knitting technique. And, the reticulate heat generating element which has the width of 80 mm, the length of 1150 mm and the resistance value of 1.8Ω, and the tin-plated copper foil which has the width of 7 mm, the length of 80 mm and the thickness of 0.1 mm were selected. And by using the ternary lead free solder of 96.5% tin, 3% silver and 0.5% copper, the electrode base layer was connected by the soldering iron which is heated at 350-400 degrees C., and was formed. And, the reticulate heater having the electrode which sealed this electrode base layer by the non-woven fabric of the polyester fiber which has the width of 30 mm, the length of 85 mm and the thickness of 0.3 mm, and by the acrylic pressure sensitive adhesive was used. Besides, the size including the overlap width in addition to the size of the reticulate heat generating element was formed, and the polyolefin series stretch-film ("super wrap kankyo omoi" or (super wrap being solicitous to environment) which is the product of Okamoto Inc.) of the thickness of 10 μm was used. Furthermore, the water-based adhesive ("3M water-based bond 7" which is the product of Sumitomo 3M Limited) whose base material is the acrylic copolymer was used as the elastic adhesive. The roller on which the fluorine resin tube was coated was used for applying this water-based adhesive on the polyolefin series stretch-film in the planar and thin state.

The whole of this test piece except the lead wire was immersed in the basket in which the salt water whose concentration of the salt content was 0.5% was filled, and applying electric current was performed for 48 hours with the voltage of 14 volts and the electric current of 7 amperes. However, the measured result of the resistance value was 1.8Ω, and it was equal before the submersion under water. Therefore, as for the reticulate heater, the waterproofness was maintained, and the exothermic abnormality was not observed.

Furthermore, the reticulate heater which is this test piece was fixed to the steering wheel as described above, and the following experiment was performed. At this time, as for the reticulate heater which is this test piece, because about 10% of the whole length could be stretched easily by the tensile force of 19.6N-29.4N, it was possible to bond tightly to the steering wheel without the wrinkles.

As for the content of the experiment, the humid state was maintained always by filling the salt water of the concentration of the salt content of 0.5% between the reticulate heater and, the surface skin portion, the heat cycle that the temperature of the salt water is changed between 60 degrees C. and 5 degrees C. every 4 hours was adopted, and the voltage of 14 volts and the electric current of 7 amperes were applied simultaneously. This experiment was performed for one week continuously. However, as for the reticulate heater, the waterproofness was maintained, and the exothermic abnormality was not observed.

From the result of this experiment, the whole of the reticulate heater could be fixed to the steering wheel in the tightly adhered state without the wrinkles. In addition, even if the microscopic defects such as the pinholes which generated in the insulating coating of the heater wire of the reticulate heat generating element occurred or even if the defect in the insulating treatment of the soldered portion of the electrode occurred, the state without the permeation of the water solution could be confirmed. Therefore, it became clear that the reticulate heater of this invention had also the waterproofness in addition to the flexibility and the elasticity.

Heretofore, the explanation was performed by the particular mode of embodiment shown in the drawing about this invention. However, this invention is not limited to the mode of embodiment shown in the drawing. And, any composition which is known heretofore can be adopted obviously insofar as the effect of this invention is achieved.

The invention claimed is:

1. A reticulate heater for a steering wheel, comprising:
a reticulate heat generating element having a plurality of insulated heater wires braided in a mesh form, and having flexibility and elasticity which allow the reticulate heat generating element to bond tightly to a curved surface of a ring portion of the steering wheel,
waterproof stretch-films which respectively cover opposing surfaces of said reticulate heat generating element water-tightly, each stretch-film having one surface bonded to said reticulate heat generating element in a state retaining the flexibility and the elasticity of said reticulate heat generating element, and
an elastic adhesive which remains flexible and elastic after curing, which is applied over the whole one surface of each of said stretch-films, and which bonds said stretch-films and said reticulate heat generating element together water-tightly even if said stretch-films are stretched within the allowable range of tensile strength, wherein:

said reticulate heater is fixed to the ring portion of the steering wheel, covering the entire circumferential surface of the ring portion of the steering wheel, said stretch films are each formed in a size which covers said reticulate heat generating element including an overlap width which has sufficient space for adhesion by said elastic adhesive, said stretch-films are each a flexible and elastic polyolefin stretch-film, said elastic adhesive is a water-based adhesive containing an acrylic copolymer, said reticulate heat generating element, said two stretch-films and said elastic adhesive have said flexibility and said elasticity respectively, said reticulate heater has waterproofness by bonding said reticulate heat generating element and said elastic adhesive together water-tightly by said two stretch-films, and said reticulate heater is fixed at an outer diameter surface portion of the ring portion of the steering wheel by stretching, wherein said reticulate heater has shrunk toward an original size at an inner diameter surface portion of the ring portion of the steering wheel by the elastic restoring force of said stretch films, such that said reticulate heater is fixed at said inner diameter surface portion of the ring portion of the steering wheel.

2. A reticulate heater for steering wheel, comprising:

a reticulate heat generating element having a plurality of insulated heater wires braided in a mesh form, and having flexibility and elasticity which allow the reticulate heat generating element to bond tightly to a curved surface of a ring portion of the steering wheel, waterproof stretch-films which cover respective opposing surfaces of said reticulate heat generating element water-tightly, each stretch film having one surface bonded to said reticulate heat generating element in a state retaining the flexibility and the elasticity of said reticulate heat generating element, and an elastic adhesive which remains flexible and elastic after curing, which is applied over the whole one surface of each of said stretch-films, and which bonds said stretch-films and said reticulate heat generating element together water-tightly even if said stretch-films are stretched within the allowable range of tensile strength, wherein:

said reticulate heater being fixed to the ring portion of the steering wheel, covering the entire circumferential surface of the ring portion of the steering wheel, said stretch films are each formed in a size which covers said reticulate heat generating element including an overlap width which has sufficient space for adhesion by said elastic adhesive, said stretch-films being flexible and elastic polyvinyl chloride stretch-films, said elastic adhesive being a synthetic rubber adhesive, a silicone-modified epoxy resin adhesive or a silicone rubber adhesive, said reticulate heat generating element, said two stretch-films and said elastic adhesive have said flexibility and said elasticity respectively, said reticulate heater has waterproofness by bonding said reticulate heat generating element and said elastic adhesive together water-tightly by said two stretch-films, and said reticulate heater is fixed at an outer diameter surface portion of the ring portion of the steering wheel by stretching, wherein said reticulate heater has shrunk toward an original size at an inner diameter surface portion of the ring portion of the steering wheel by the elastic restoring force of said stretch films, such that said reticulate heater is fixed at said inner diameter surface portion of the ring portion of the steering wheel.

3. The reticulate heater for steering wheel according to claim 1 or 2, wherein each of said stretch-films has a thickness of from 10μm or more to 20μm or less.

4. The reticulate heater for steering wheel according to claim 1 or 2, wherein said reticulate heat generating element is formed by tricot knitting of a plurality of said insulated heater wire knit loops in continuous and planar state in a longitudinal direction.

5. The reticulate heater for a steering wheel according to claim 4, wherein said reticulate heat generating element includes electrodes which are arranged in both end portions of the longitudinal braiding direction which is the braiding direction of the loops in the distant state so that electric current can be applied.

6. The reticulate heater for a steering wheel according to claim 5, wherein said electrode is soldered by stacking end portions of predefined numbers of heater wire onto a thin, rectangular and planar metal foil.

7. The reticulate heater for steering wheel according to claim 1 or 2, wherein each of said stretch-films has a thickness of from 5μm or more to 50μm or less.

\* \* \* \* \*